April 20, 1937.   J. W. HORNBROOK   2,077,696
AUTOMATIC CHUCK CONTROL FOR ROTARY CORE DRILLING MACHINES
Filed Oct. 11, 1935   2 Sheets-Sheet 1
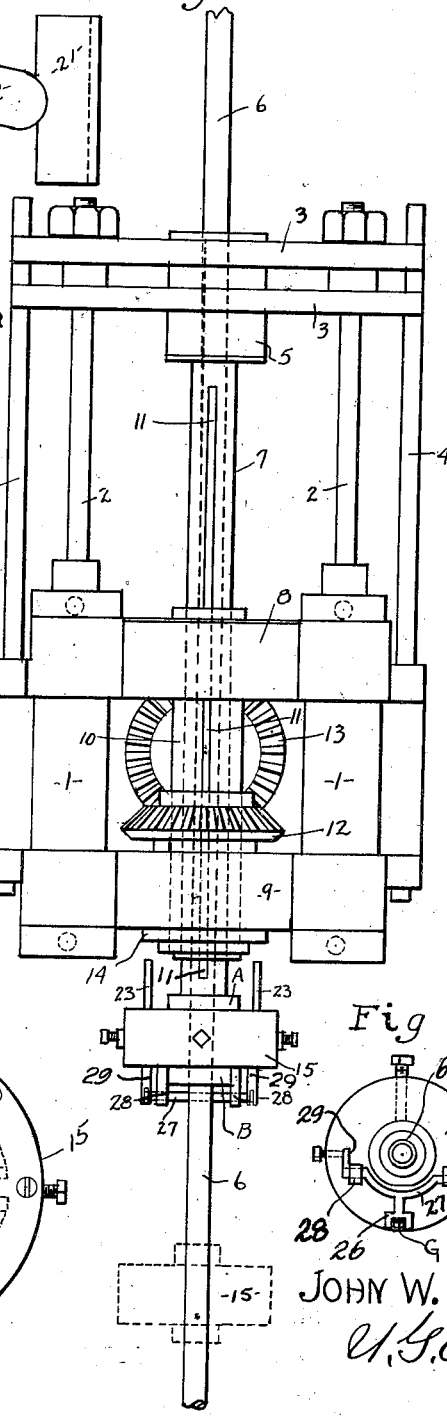
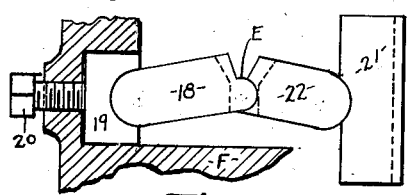
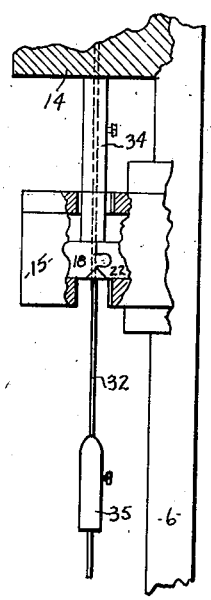
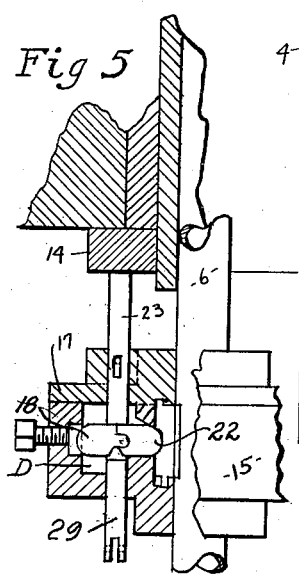
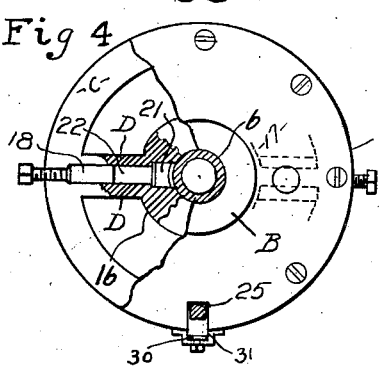
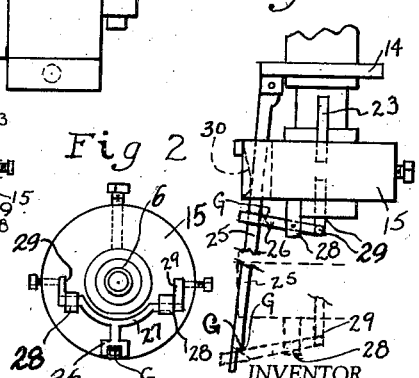
INVENTOR.
JOHN W. HORNBROOK
U. G. Charles
ATTORNEY.

April 20, 1937.  J. W. HORNBROOK  2,077,696
AUTOMATIC CHUCK CONTROL FOR ROTARY CORE DRILLING MACHINES
Filed Oct. 11, 1935   2 Sheets-Sheet 2

INVENTOR.
JOHN W. HORNBROOK
BY
ATTORNEY.

Patented Apr. 20, 1937

2,077,696

UNITED STATES PATENT OFFICE 2,077,696

AUTOMATIC CHUCK CONTROL FOR ROTARY CORE DRILLING MACHINES

John W. Hornbrook, Larned, Kans.

Application October 11, 1935, Serial No. 44,565

3 Claims. (Cl. 255—22)

My invention relates to automatic chuck control for rotary core drilling.

The object of my invention is to provide a chuck for a rotary core drilling machine, the chuck having jaws to engage as turning, raising and lowering means therefor, and having automatic release for the jaws at chosen intervals of downward movement of the stem and means to automatically engage the jaws with the stem when the chuck is raised to a pre-determined point.

A further object of my invention is to provide an adjustment for the automatic feature whereby the engagement of the jaws at intervals may be varied with respect to distance of travel.

A still further object of my invention is to provide a chuck having radially movable jaws to engage with the stem of a core drill or like purpose, and means to move the jaws automatically to and from engagement with the pipe element controlled thereby, with respect to turning and forcing the said element downward during the period of rotation, and the said chuck through the medium of hydraulic power, will function to raise or lower the said drilling element, the chuck being inexpensive to manufacture, effective in its operation and designed to co-act with machines arranged for core drilling or the like.

These and other objects will hereinafter be more fully explained, reference being had to the accompanying drawings forming a part of this specification and in which like characters will apply to like parts or their equivalent in the different views. Referring to the drawings:—

Fig. 1 is an elevation of a standard make of core drilling machine with the chuck embodied therewith.

Fig. 2 is a plan view of the chuck.

Fig. 3 is a side view showing the automatic arrangement to engage and disengage the jaws within the clutch, the latter not being shown.

Fig. 4 is an enlarged plan view of the chuck, parts removed for convenience of illustration.

Fig. 5 is a side view of Fig. 4, partly in section.

Fig. 6 is a fragmentary side view of the chuck, having embodied therewith a modification to engage and disengage the jaws.

Fig. 7 is a second modified view of the toggle joint in working relation to one jaw and illustrating the means of adjustment for the outer end of the said toggle joint element.

Fig. 8 is a plan view of Fig. 7, part of the member abutting the jaw removed and a portion of the chuck housing in section.

Figure 9:
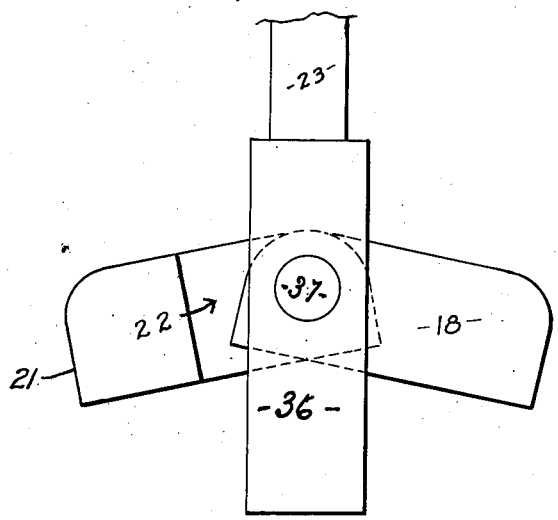
Fig. 9 is a side view of the toggle joint as a third modification to actuate the same, the jaw being integral therewith.

The invention herein disclosed relates to a chuck, the parts of which are later described, and the said chuck is an attachment operative with a machine portably arranged and consisting of a pair of hydraulic cylinders 1, each having a piston therein and a rod 2 for reciprocating movement, the upper ends of the rods being connected by a yoke 3, each end of the yoke has a guide 4 secured to and in parallelism with the axis of their respective cylinders.

Centrally positioned in the yoke is a bearing or guide element 5 for the stem 6 of a core drill, the drilling element not shown in the drawings, the guide consists of a hollow splined shaft 7 that is carried by the said yoke reciprocatingly, it being understood that provision is made in connection with each cylinder to introduce alternately fluid in the ends thereof as actuating means for their respective pistons simultaneously in each direction, the valve governing the fluid not shown in the drawings.

The upper and lower ends of the cylinders are connected by bars 8 and 9 respectively, the said bars also function as a bearing for a sleeve 10 rotatable therein, the said sleeve having keys to engage in the grooves 11 of shaft 7, by which means the said shaft is turned through the medium of a series of gears 12 and 13, gear 12 being secured to the sleeve while gear 13 in mesh therewith is secured to a shaft that is power driven, the latter not shown in the drawings.

The foregoing description was merely to set forth a standard make of machine such as commonly employed in core drilling or the like and having a chuck to work in conjunction therewith, the chuck not having an automatic arrangement to actuate the movement of the jaws embodied therewith and to overcome the uncertainty of chuck engagement, I have arranged and placed in working relation with the machine previously described, a chuck with automatic means to actuate the jaws of the chuck, and means to control the vertical movement with respect to a drill stem longitudinally with which the chuck is engaged, but actuated by the said machine and arranged as follows; secured to the lower extremity of sleeve 10 is a plate 14 rotatable therewith for the purpose later described.

Secured to the lower end of the said splined shaft 7 is a housing 15 embodying my invention with other features in connection therewith and to which attention is directed, the said housing has hubs A and B that are axially bored, hub A, adapted to receive by threaded engagement or otherwise, the lower end of the said shaft 7, previously mentioned and rotatable therewith, while hub B is bored large enough to engage loosely with the said pipe stem 6 that extends upward through shaft 7, so that added joints may be coupled to the upper end as the drill head turned thereby descends.

To turn the said stem while being forced downward and turned by the machine heretofore explained, will be as follows.

The said housing has an inner hub element 16 bored in registery with hub B and an annular rim C to which a plate 17 is secured by cap screws spaced therearound, radially extending and spaced apart is guide elements D integrally joined and extending from the rim to hub 16, there being a similar guide arrangement oppositely positioned as shown by dotted lines in Fig. 4.

Positioned between the said guides is a toggle jointed element, movably fitting and consisting of a member 18, the outer end of which abuts with a movable block 19 seating therein as shown in Figs. 7 and 8, the said block having a screw 20 to move the same as adjusting means for the toggle jointed element, which acts upon a jaw 21 that is movable radially and seated within the said internal hub 16, through the medium of the said toggle jointed element, the other member 22 of which abuts therewith at one end, while the other end abuts with the inner end of the first said toggle jointed member 18, the abutting ends of the said members are rockably secured to each other by a tongue E integral with member 18, the outer end of which is rounded to engage in a seat in the other member coinciding therewith.

The said bearing arrangement being on a lower plane than the axis of the outer end bearings, is means to retain the said members in straight alignment when forced downward to engagement on bed F, integral with the housing and at which position the said jaw members are brought to snug engagement with the stem, it being understood that the said jaws have an arcuate toothed face in contact with the stem to avoid slipping movement thereon.

As actuating means for the said toggle joint arrangement, there is positioned a pin 23 slidably arranged in a suitable aperture in vertical alignment with the joint of the toggle element and resting thereon, while the other end is adapted to engage on a plate 14 secured to and rotatable with the said sleeve 10, by which means as the chuck approaches its extreme upward movement, the said pin will rock the toggle joint members 18 and 22 in straight alignment with each other, forcing the jaws to engagement, and to break the jointed element for disengagement at the extreme downward movement of the chuck carrying the pipe therewith, I have pendantly and rockably secured to the said plate 14 a rod 25, extending downward sufficient to permit a complete downward movement of the piston stroke, at which point the lower end of said rod has a shoulder G spaced upward a short distance from the lower end thereof, and adapted to strike on the outer end of a bifurcated arm 26 that is joined to an arcuate yoke 27 as rocking means therefor, the said yoke rockable on bearings 28 and the free ends of which has pins 29, pivotally connected and extending upward through the housing shell in alignment with pins 23 respectively, by which means when the last said pins are moved upward as described, the toggle jointed elements are broken and rocked to position as shown in Fig. 7.

At the moment of the upward movement of the chuck, the yoke is rocked by the shoulder engagement with the arm, the arm however will disengage from the said shoulder by its downward slanting position as shown in Fig. 3, the rod 25 being free to swing outward so that the end of said arm will slide therealong, holding the jaws from engagement but over-powered by the actuation of pin 23 at the moment of the extreme upward movement for a repeated grip on the drill stem and so on during the drilling process.

The said rod 25 is tensioned toward the yoke arm at all times by a leaf spring 30, carried by the housing in working relation to a slotted opening 31, and the downward extension of the said rod from the shoulder is means to avoid excess inward movement, when the end of the arm passes the shoulder.

In Fig. 6 is shown a modification of the actuating means to rock the knee of the toggle joint, said means consisting of a single rod 32 for each toggle joint, the said rod pendantly carried by plate 14, from whence it extends downward through the chuck housing and upon which the housing will slidably engage in its reciprocating movement, the toggle joint at the knee portion apertured as at 33 which also slidably engages on said rod as carried by the housing and to actuate the said toggle joint to and from engagement there is placed a pair of apertured strikers 34 and 35, each slidable on said rod and means to secure the same at selected points along said rod to vary the moment of engagement alternately with the toggle joint to engage and disengage the same.

Figure 10:
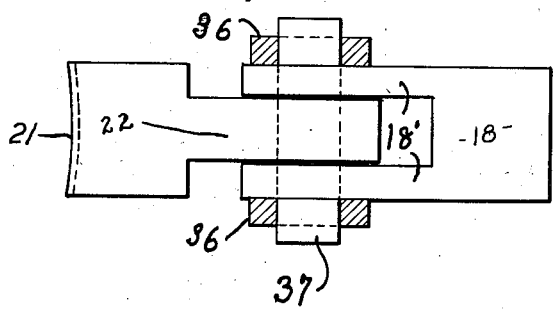
Fig. 10 is a plan view of Fig. 9.

As illustrated in Figs. 9 and 10 the toothed jaw is integrally joined to member 22, the method of which will simplify a certain feature of construction in the housing adjacent the aperture through which the drill stem extends, there is also arranged as a connection for the knee joint of the said members 22 and 18 a coupling 36 centrally slotted, the sides of which are expanded sufficient to receive the bifurcated end of member 18, the legs of which are indicated as at 18' and adapted to receive the adjacent end of member 22, rockable when the said members 22 and 18 are moved to and from alignment as carried by a pin 37 pivotally connecting the same and also the coupling, secured to the upper end of the coupling is pin 23 as engaging means for the joint, while the lower end is acted upon by pin 29 to break the joint.

With the above described arrangement with respect to the coupling, it will be understood that the said coupling may be eliminated, but the adjacent ends of the toggle joint remain pivotally connected by the said pin 37, in which event pins 23 and 29 will act upon the knee of said toggle joint as heretofore described, furthermore vertical guides may be provided and in which the outer extending ends of the said pin 37 will slidably engage as positive means to move each free end of the toggle joint inward at the time of breaking the joint for disengagement.

Being thus arranged the adjusting block and its respective screw tensioning means may be eliminated and if retained the said vertical guides should taper slightly from the base to the upper extremity, at which point the ends of the pin would closely fit.

It will be understood that the aperture in the housing adjacent their respective strikers will be of sufficient size to receive the same, while the aperture through the knee of the toggle will permit a smooth running fit on the rod.

Inasmuch as the drilling operator, to observe the movement of the drill, the switching of the fluid from one end of the cylinders to the other is actuated at the discretion of the operator, however an automatic trip to accomplish the same result may be arranged in conjunction with the automatic features herein described and such other modifications may be employed as lie within the scope of the appended claims.

Having fully described my invention, what I claim as new and desire to secure by Letters Patent is:—

1. An automatic chuck control for rotary core drilling machines, the machine having a sleeve and means to rotate the same and a hollow splined shaft slidably engaging in the sleeve and rotatable therewith, a plate secured to the sleeve near the lower end thereof and rotatable therewith, a housing secured to the lower end of the hollow splined shaft and rotatable therewith, a pair of toothed jaws positioned in the housing and adapted to slide toward and from the axis of the housing, a toggle joint for each of the jaws and means carried by the plate to actuate each toggle to move the said jaws simultaneously toward and from each other for the purpose specified.

2. In automatic chuck control for rotary core drilling machines, the machine having a sleeve and means to rotate the same and a hollow splined shaft slidably engaging in the sleeve and rotatable there-with, a plate carried by the sleeve and rotatable there-with, a housing secured to the splined shaft and rotatable there-with, a pair of jaws positioned in the housing and adapted to slide toward and from the axis of the housing, a toggle joint for each of the jaws, means carried by the plate to permit outward movement of the jaws as the housing moves to its downward extremity and a pin seated on each toggle joint and outward extending from the housing as means to actuate the joints, moving the jaws inward as the pins contact the plate in the upward movement of the housing.

3. In automatic chuck control for rotary core drilling machines, the machine having a sleeve and means to rotate the same and a hollow splined shaft slidably engaging in the sleeve and rotatable there-with, a plate carried by the sleeve and rotatable there-with, a housing secured to the splined shaft and rotatable there-with, a pair of jaws positioned in the housing and adapted to slide toward and from the axis of the housing, a toggle joint for each of the jaws, a yoke rockably carried by the housing and pins pivotally carried by the yoke to engage on the under side of the toggle joint to break the same for outward movement of the jaws, and means carried by the plate to actuate the rocking movement of the yoke, pins slidably carried by the housing to engage on the upper side of said toggle joints, the pins to actuate the joints, moving the jaws toward each other as the said pins contact the said plate in the upward extreme movement of the housing.

JOHN W. HORNBROOK.